(12) United States Patent
Zunke

(10) Patent No.: US 8,655,785 B2
(45) Date of Patent: Feb. 18, 2014

(54) COMPUTER DATA PRODUCT LICENSE INSTALLATION / UPDATE CONFIRMATION

(75) Inventor: Michael Zunke, Kirchheim (DE)

(73) Assignee: SafeNet Data Security (Israel) Ltd., Petach Tikva (IL)

( * ) Notice: Subject to any disclaimer, the term of this patent is extended or adjusted under 35 U.S.C. 154(b) by 732 days.

(21) Appl. No.: 12/028,808

(22) Filed: Feb. 10, 2008

(65) Prior Publication Data

US 2009/0205040 A1 Aug. 13, 2009

(51) Int. Cl.
*G06F 21/00* (2013.01)

(52) U.S. Cl.
USPC ............. 705/59; 705/51; 705/55; 705/57; 705/58; 726/9

(58) Field of Classification Search
USPC .................................. 705/51, 57, 59
See application file for complete search history.

(56) References Cited

U.S. PATENT DOCUMENTS

| | | | |
|---|---|---|---|
| 5,984,508 A * | 11/1999 | Hurley | 700/237 |
| 6,023,766 A * | 2/2000 | Yamamura | 726/29 |
| 6,169,976 B1 * | 1/2001 | Colosso | 705/59 |
| 6,199,204 B1 * | 3/2001 | Donohue | 717/178 |
| 6,343,280 B2 * | 1/2002 | Clark | 705/55 |
| 7,688,982 B2 * | 3/2010 | Vauclair | 380/284 |
| 7,813,822 B1 * | 10/2010 | Hoffberg | 700/94 |
| 2003/0028786 A1 * | 2/2003 | Mustafa | 713/189 |
| 2003/0200149 A1 * | 10/2003 | Gonzalez et al. | 705/26 |
| 2004/0133794 A1 * | 7/2004 | Kocher et al. | 713/193 |
| 2005/0027846 A1 | 2/2005 | Wolfe et al. | |
| 2005/0204405 A1 * | 9/2005 | Wormington et al. | 726/27 |
| 2006/0064582 A1 | 3/2006 | Teal et al. | |
| 2006/0075001 A1 | 4/2006 | Canning et al. | |
| 2007/0226805 A1 | 9/2007 | Jeal et al. | |
| 2007/0244823 A1 * | 10/2007 | Motley et al. | 705/59 |

\* cited by examiner

*Primary Examiner* — Calvin Cheung
(74) *Attorney, Agent, or Firm* — Drinker Biddle & Reath LLP

(57) ABSTRACT

An authenticated digital confirmation of an installation or an update of a licensed computer data product, for providing the licensor with a validation that the installation/update was carried out as intended, and conveying relevant details of the installation/update. The installation/updating facility (internal software, external hardware device, or combination thereof) examines and documents the pre-installation/update state of the target computer system, performs the installation/update, examines and documents the post-installation/update state, and generates the confirmation, which is a summary or digest of the process and the status thereof. The confirmation is securely authenticated and sent to the licensor for validation, to be used for order fulfillment, billing and accounting, and other purposes.

21 Claims, 5 Drawing Sheets

COMPUTER DATA PRODUCT LICENSE INSTALLATION / UPDATE CONFIRMATION

FIELD OF THE INVENTION

The present invention relates to digital rights management, and, in particular, to a method and system for providing and managing computer data product license installation/update confirmations.

BACKGROUND OF THE INVENTION

Computer data products are commonly licensed to organizations which provide the licensed data products to a number of different individual users within the organization. It is also commonplace for a particular licensed computer data product to be issued in a series of different versions and to exist in a number of distinct configurations within each version. Specifically, different versions can exhibit different operational characteristics, different data compatibilities, and/or different capabilities. Furthermore, different configurations can also have different features and/or operational capabilities. Different users may require different versions and/or different configurations, depending on their particular needs.

Licensed Computer Data Products

The terms "licensed computer data product", "licensed data product", and variants thereof herein denote any computer-related data product that is covered by a license, including, but not limited to: executable data, executable programs, applications, utilities, routines, applets, or similar code for execution on a computer; and content in digital data form (herein denoted as "digital content"), such as text, data and other data, audio, video, photographs, graphics, and multimedia; and games and the like, including supporting executable code, if any.

The term "computer" herein denotes any data processing device, including, but not limited to: mainframe computers; personal computers; workstations; servers; data network devices; portable computers, such as notebook computers, personal digital appliances (PDA), and the like; data terminals; game-playing devices; media players, multi-media players, and players of licensed data products; external hardware devices, including dongles and the like; and telephonic devices with data processing capabilities, such as cellular telephones.

Configurations and Versions

In a non-limiting example of different configurations for a licensed computer data product, a sophisticated user of a spreadsheet application might need advanced mathematical analysis functions that a casual user would not need. In this non-limiting example, the advanced mathematical analysis functions are typically provided via a module of add-on functions, a plug-in application, a special applications pack, or similar additional executable code. Other non-limiting ways of implementing such extensions in a licensed computer data product include providing all possible features thereof as latent capabilities within the product, but require the user to activate them via a special procedure. The term "user" herein is expansively construed to include the licensee of a licensed computer data product; or the licensee's employee or other authorized agent.

It often occurs within an organization that different users of a particular licensed computer data product require different versions and/or different configurations. In turn, a licensed data product typically requires an individual license update to change an installation to a different version or to a different configuration. Thus, a version update or a configuration update for a licensed computer data product implies an update to the license for the computer data product. Hence, it is understood that a reference herein to a version update or a configuration update for a licensed computer data product is accompanied by a corresponding update of the license itself.

The term "update" herein denotes any change or modification to an existing or installed license or to existing or installed license-related parameters, and includes, but is not limited to, changes commonly referred to as "installation", "upgrades" (feature additions); "downgrades" (feature removals); "renewals"; "extensions"; and "uninstallation" (complete removal of the licensed computer data product); and "maintenance". It is emphasized that the term "update" is expansively construed to include the initial installation of the licensed computer data product and/or the license therefor, notwithstanding any juxtaposition of the terms "installation" and "update" herein (such as use of the term "installation/update") to stress the inclusion of the initial installation within the scope of updates.

License Feature Updates

In addition, there are update requirements that involve only licensing features. The term "organization" herein denotes any collection of individuals or individual entities that utilizes or benefits from the use of a licensed data product, including, but not limited to: commercial; governmental; institutional; social; political; religious; educational; philanthropic; or special-interest groups. The term "user" herein denotes a licensee of a licensed data product, or an authorized member of a licensee organization. The term "licensee" is herein expansively construed to include prospective future licensees and past licensees as well as current licensees. The term "licensing" herein encompasses all aspects and features of a license to use a licensed data product, including, but not limited to: the issuance of the license; the terms of the license; use, effect, or properties of the license not covered by a license agreement; and legal aspects of the license. The term "license feature" herein denotes any term or condition of a license. Non-limiting examples of license features include: term or extent of the license; applicability of the license; limitations of the license; legal conditions on the license.

A non-limiting example of a license matter involves licensed data products that have time-based licenses, such as subscription-based licensing. A particular user may be informed that his or her subscription to use a particular licensed computer product is about to expire, and the license requires renewal. Although there are no version or configuration updates involved in this case, the license itself requires update regarding the terms thereof (e.g., a time-extension or renewal). Other license updates include factors such as the number of times a licensed data product can be used. There is also a certain degree of overlap with configuration parameters, such as the resources available to a licensed data product, and the functionality that is available to a licensed data product. Therefore, the terms "version/configuration/license update" and variants thereof herein denote any change to the terms or other parameters of a licensed computer data product that involves modifications to the licensing thereof.

Monetary Aspects of License Update

There are often monetary values associated with a particular license. The term "monetary value" in the context of a license herein denotes any cost factor associated with the license or a feature thereof.

Following are three non-limiting examples involving monetary value of a license:

Example 1: A user purchases a license upgrade for a particular data product configuration that involves the installation of additional product features. The license upgrade has an additional cost, which the user pays to the vendor. In fulfillment of the purchase, the vendor sends the user an executable software application (or script) to install, set up, enable, or activate the additional product features covered by the license upgrade.

Example 2: A user has purchased a subscription extension for a time-based or usage-based license, wherein the data product itself monitors the time and/or usage for which the customer has purchased the extension. In fulfillment of the purchase, the vendor sends the user an executable software application (or script) to modify the license and the data product monitoring of the time and/or usage accordingly.

Example 3: A user has purchased a license for a particular data product configuration that is more comprehensive than actually required, and wishes to downgrade the configuration by removing, deactivating, or disabling certain unneeded features of the product. After performing the product downgrade, the user is entitled to a partial refund of the license fee corresponding to the monetary value of the features no longer included in the originally-installed configuration.

There is thus a need for, and it would be highly advantageous to have, a method and system for efficient and definitive confirmation of version/configuration/license updates (including both upgrades and downgrades) actually installed on a computer for a licensed data product. This goal is met by the present invention.

SUMMARY OF THE INVENTION

The present invention is of a system and method for providing a digital confirmation to prove that a specified installation or update to a licensed computer data product was performed on a specific computer.

According to an embodiment of the present invention, the digital confirmation is authenticated to prevent tampering, forgery, and unauthorized use. According to other embodiments of the present invention, the digital confirmation provides one or more of the following:

snapshots of the configuration of the licensed computer data product before and/or after the update;
validation that the host computer system (the client computer) is authorized to accept the update;
validation of the licensed computer data product;
validation of the update;
one or more timestamps related to the time of the update.
machine-readable data indicative of the post-installation state of the features and functionalities provided by the licensed computer data product;
machine-readable data indicative of the pre-update state of the features and functionalities formerly provided by the licensed computer data product;
machine-readable data indicative of the post-update state of the features and functionalities currently provided by the licensed computer data product; and
a display to the user of the status of the update.

The term "machine-readable data" herein denotes data that can be read by a computer without human interpretation.

Embodiments of the present invention also provide:
a client license update manager to perform the update;
a client license update confirmation manager to generate and authenticate a confirmation of the license update; and
a server license update confirmation manager to receive and validate the license update confirmation.

Therefore, according to the present invention there is provided a system for confirming an update of a licensed computer data product in a client computer, the system including: a client license update manager, configured to perform the update; a client license update confirmation manager, configured to generate an update confirmation, and including an authenticator configured to authenticate the update confirmation, wherein the update confirmation includes at least: a status of the update; machine-readable data indicative of the post-update state; and an authentication, for validating the authenticity of the confirmation; and a server license update confirmation manager, configured to receive the confirmation, and including a validator configured to validate the authentication.

In addition, according to the present invention there is provided a system for confirming an update of a licensed computer data product in a client computer, the system including: a client license update manager, configured to perform the update; a client license update confirmation manager and a sequential update counter configured to generate an update confirmation, and including an authenticator configured to authenticate the update confirmation, wherein the update confirmation consists only of: a sequential number generated by the sequential update counter; and an authentication, for validating the authenticity of the confirmation; and a server license update confirmation manager, configured to receive the confirmation, and including a validator configured to validate the authentication.

Furthermore, according to the present invention there is provided a method for confirming an update of a licensed computer data product in a client computer, the update being from a licensee of the licensed computer data product, the method including: receiving a license update for the licensed computer data product by the client computer; installing the licensed data product update in the client computer; collecting configuration and license parameters for the licensed computer data product in the client computer subsequent to the installing; generating an update confirmation from the configuration and license parameters, and including at least: a status of the update; machine-readable data indicative of the post-update state; and an authentication, for validating the authenticity of the confirmation; authenticating the update confirmation to produce the authentication; sending the confirmation to the licensee; receiving the confirmation by the licensee; and validating the confirmation according to the authentication.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and use of a license update confirmation, and of client and server managers therefor, according to embodiments of the present invention may be understood with reference to the drawings and the accompanying description.

Need for Confirmation of License Update

In all of the non-limiting examples previously discussed, there is a need for confirmation of the data product and license update which has actually taken place.

In Example 1, the vendor may indeed deliver an executable application (or script), but the fulfillment of the user's paid order for a license upgrade does not actually occur until the executable application (or script) successfully installs, activate, or enables the product upgrade on the user's computer. Thus, a vendor needs to verify that the license upgrade was indeed installed, activate, or enabled, to avoid charging a customer for an upgrade that was not successfully installed. Similarly, for Example 3, the fulfillment does not occur until the change in license features is effectively recognized by the data product.

Likewise, for Example 3, the user is not entitled to a refund until the downgrade has successfully taken place.

In all cases above, the vendor needs to receive certification that the installation, downgrade, etc., has actually taken place on the user's computer.

License Update Confirmation Data Structure

Figure 1:
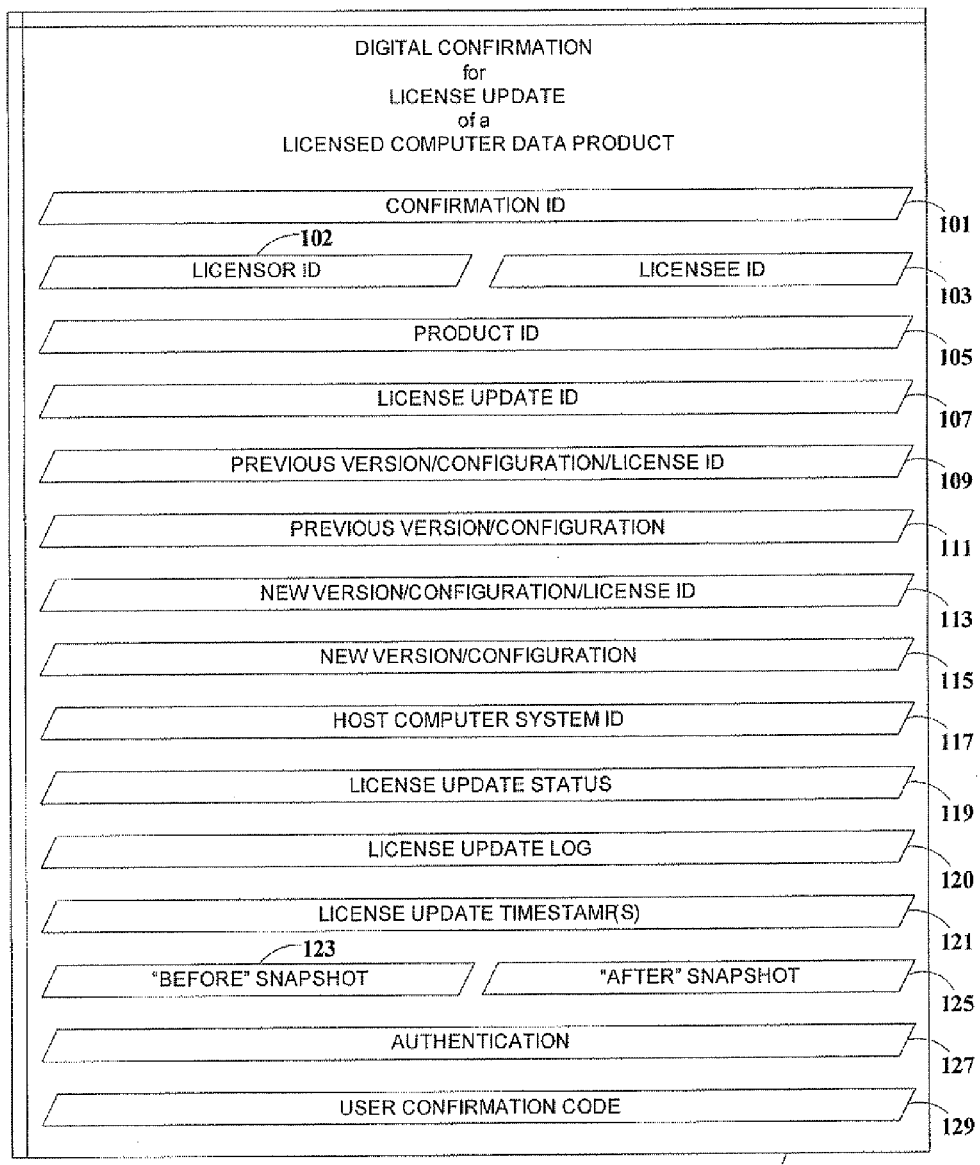
FIG. 1 conceptually illustrates the data structure of a license update confirmation according to an embodiment of the present invention.

FIG. 1 illustrates a license update confirmation data structure 100, for a licensed computer data product according to embodiments of the present invention. Different embodiments of the present invention exhibit different combinations of the following non-limiting features illustrated in FIG. 1:

A confirmation ID 101 serves to uniquely identify the confirmation as a data object, and can comply with any suitable standard for data object identifiers. A licensor ID 102 identifies the licensor, and a licensee ID 103 identifies the licensee, of the licensed computer data product to which confirmation 101 applies. A product ID 105 identifies the specific licensed computer data product which is the subject of the update involved. Furthermore, a license update ID 107 serves to identify the particular installation or update which is being confirmed. In an embodiment of the present invention, the licensor may choose to limit the information in update ID 107 to general version information; in another embodiment, the licensor may choose to include a unique serial number representing, in a non-limiting example, the particular licensing transaction associated with the update.

A previous version/configuration/license ID 109 identifies the licensor's unique identifier for the version/configuration/license that existed in the licensee's computer system prior to the update. A previous version/configuration field 111 is a general description of the version/configuration of the licensed computer data product as found in the licensee's computer system prior to the update. Likewise, a new version/configuration/license ID 113 identifies the licensor's unique identifier for the version/configuration/license that exists in the licensee's computer system after the update. A new version/configuration field 115 is a general description of the version/configuration of the licensed computer data product as found in the licensee's computer system after the update.

A host computer system ID 117 identifies the specific client computer system on which the license update was performed, and a license update status 119 indicates the results of the installation or update (non-limiting examples of which include: success, failure, partial success (along with the specific features successfully installed and not successfully installed, etc.). A license update log 120 records the sequence(s) of license installation or update events. One or more license update timestamp(s) 121 indicate the specific time(s) that the installation or update was performed. In an embodiment of the present invention, license update log 120 is combined with update timestamp(s) 121. In this embodiment, timestamp(s) 121 appear in license update log 120 with the license installation or update events to which they correspond.

Figure 2:
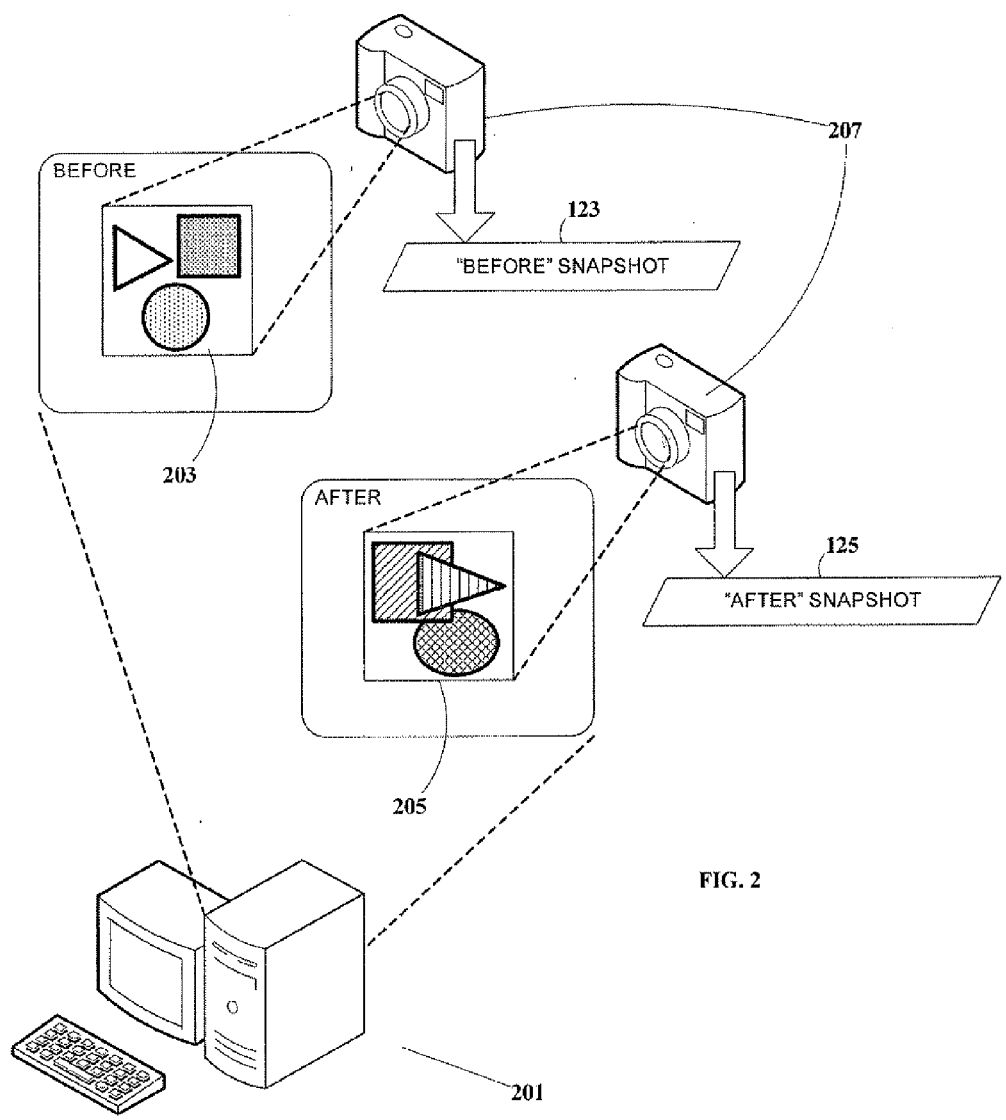
FIG. 2 conceptually illustrates snapshot data, according to embodiments of the present invention, of version/configuration/license states as originally installed in a computer and as updated.

In an embodiment of the present invention, a "before" snapshot 123 provides a detailed description of the state of the computer system prior to installation or update of the licensed computer data product; and an "after" snapshot 125 provides a detailed description of the state of the computer system subsequent to installation. Refer to FIG. 2 and the discussion below for more detail on this feature.

To prevent tampering of confirmation 100, an authentication 127 is provided, whereby the validity of confirmation 100 can be conclusively demonstrated. As provided by embodiments of the present invention, validation is accomplished by a process certifying that authentication 127—and hence confirmation 100—was issued by an authorized license update entity (such as a client confirmation manager, described below) and was not tampered with or altered. Any suitable authentication technique may be employed, including, but not limited to: digital signature authentication; encryption; and by the inclusion of secret data known only to the licensor and to the authorized license update entity. With the inclusion of authentication 127, confirmation 100 serves as reliable evidence that the installation or update characterized and described therein has actually taken place as detailed. The licensor can therefore rely on confirmation 100 when finalizing transactions with the licensee.

In an embodiment of the present invention, a user confirmation code 129 is also provided, so that the user can be advised of the status of the update as well.

Other embodiments of the present invention provide for additional specialized information related to the licensed computer data product. In a non-limiting example, a licensor may license the data product for a certain number of uses, viewings, invocations, etc. (such as for a motion picture). The licensee may wish to upgrade the license to allow an additional number of such uses, viewings, invocations, etc. In this embodiment, confirmation 100 includes a field indicating the number of previous uses, viewings, invocations of the data product prior to the update.

In a non-limiting embodiment of the present invention, license update confirmation data structure 100 is a database record, and the contents thereof (confirmation ID 101, licensor ID 102, licensee ID 103, etc.) are fields or sub-records within the database record.

Version/Configuration/License Identifier

In an embodiment of the present invention version/configuration/license identifier 109 (FIG. 1) serves as a combined version identifier, configuration identifier, and license identifier for the previous state of the client computer system, prior to the update. Likewise, in this embodiment, version/configuration/license identifier 113 serves as a combined version identifier, configuration identifier, and license identifier for the new state of the client computer system, subsequent to the update. In other embodiments of the present invention, a version identifier, a configuration identifier, and a license identifier are separate and distinct.

In an embodiment of the present invention, a combined version/configuration/license identifier is implemented via a sequential update counter, which is used for all updates. In this embodiment of the present invention, version/configuration/license identifier 113 for the state of the client computer after the update is the number immediately following that of version/configuration/license identifier 109.

In an embodiment of the present invention, a license update confirmation includes an authenticated number generated by a trusted sequential update counter. In a related embodiment of the present invention, the license update confirmation consists of only the authenticated number, such as the number and an authenticating signature. In these embodiments, the licensor is guaranteed of the accuracy of the update confirmation (and the current state of the client computer) by requiring the updates to be done in strict sequential order with no omissions of any numbers. According to these embodiments, only a small amount of data need be sent from the client computer to the licensor's computer to confirm the update. Because the data to be transferred is very small, there is considerable flexibility in the transmission of the data. In a further related embodiment of the present invention, the confirmation data is sent via telephone.

Snapshots of the Computer State

FIG. 2 conceptually illustrates snapshots of the state of a computer system 201. A "before" state 203 of computer system 201, prior to an update of a licensed computer data product, includes, but is not limited to: hardware configuration and parameters thereof, processors, memory, peripherals, and data storage devices, and the model and serial numbers thereof memory image; operating system configuration and parameters thereof, registry, initialization and startup files; computer software, applications, utilities, drivers, applets, routines, and initialization and startup files therefor; computer data, digital certificates, authorizations, and permissions, encryption/decryption keys, style sheets, fonts, graphics, photographs, music, motion pictures, animations, and the like, whether loaded into memory or located in storage media; and similar licensed computer data products and hardware associated therewith. An "after" state 205 of computer system 201 is of a similar nature, but subsequent to an update of a licensed computer data product.

A snapshot utility 207 is provided to capture a condensed digest or summary of state 203, as "before" snapshot 123, and a like condensed digest or summary of state 205, as "after" snapshot 125. In an embodiment of the present invention, the times of snapshots 123 and 125 are stored as timestamps in license update timestamp field 121. In a related embodiment, snapshots 123 and 125 are recorded as events in license update log 120.

Even though the information contained in confirmation 100 is typically only a digest or summary of the post-installation/update state of the target computer, the validation of authentication 127 serves to guarantee to the licensor that the entire update has been completed.

Client License Update Confirmation Manager

Figure 3:
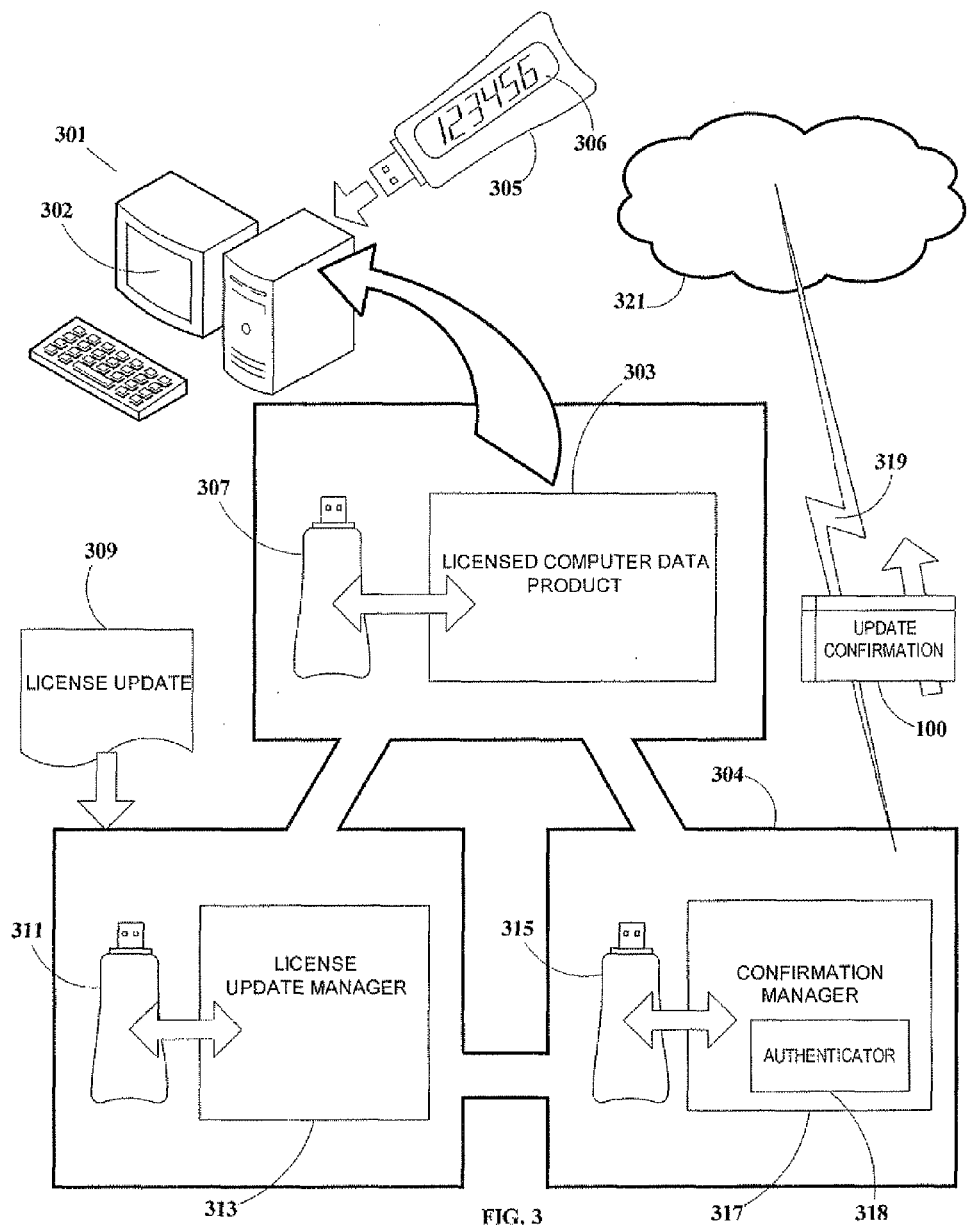
FIG. 3 is a conceptual system diagram of a computer having a client license update confirmation manager according to embodiments of the present invention.

FIG. 3 is a conceptual system diagram of a client computer 301 having a client license update confirmation manager 317 according to embodiments of the present invention. Included within license update confirmation manager 317 is an authenticator 318 for certifying the authenticity of update confirmation 100. License update confirmation manager 317 is seen in the context of computer 301 which has a licensed computer data product 303 and a license update manager 313. In various embodiments of the present invention, one or more of licensed computer data product 303, client license update manager 313, and client license update confirmation manager 317 are at least partially contained within computer 301 (such as in the memory and/or storage 304 of computer 301) and/or within a removable external hardware device, such as a dongle 305 that plugs into computer 301. In an embodiment of the present invention, dongle 305 features a display 306 for displaying status codes to the user. In an embodiment, part or all of licensed computer data product 303 is contained within a dongle 307; in an embodiment, part or all of license update manager 313 is contained in a dongle 311; and in an embodiment, part or all of confirmation manager 317 is contained within a dongle 315. In an embodiment of the present invention, one or more of dongle 307, dongle, 311, and dongle 315 are the same physical device as dongle 305.

In operation, a license/license update 309 is received by license update manager 313, which then proceeds to install licensed computer data product 303 if not already installed, or to update licensed computer data product 303 if already installed. Confirmation manager 317 tracks these operations, takes snapshots 123 and 125, and records these events in license update log 120. When update is complete, confirmation manager 317 generates confirmation 100. In an embodiment of the present invention, confirmation manager 317 also shows user confirmation code 129 on a display 302 of computer 301, and/or on a display 306 of dongle 305. The user may thereafter contact the licensor by telephone or facsimile transmission with user confirmation code 129.

In an embodiment of the present invention, confirmation manager 317 communicates confirmation 100 over a network 321 via a link 319.

Server License Update Confirmation Manager

Figure 4:
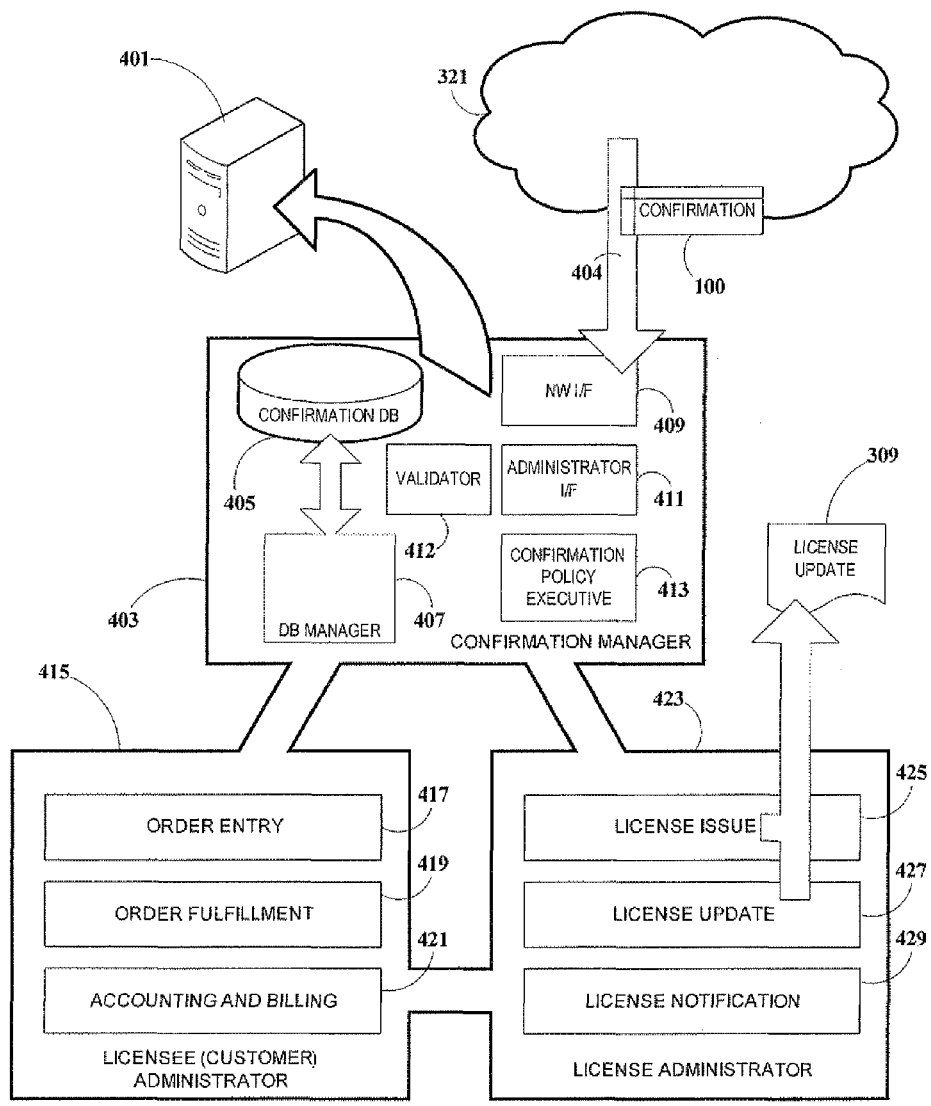
FIG. 4 is a conceptual system diagram of a license server having a license update confirmation manager according to embodiments of the present invention.

FIG. 4 is a conceptual system diagram of a license server 401 having a license update confirmation manager 403 according to embodiments of the present invention. License server 401 also contains a licensee (customer) administrator 415, which includes an order entry module 417 for receiving and processing customer orders, an order fulfillment module 419, which communicates with a license administrator 423 (described below), and an accounting and billing module 421.

As just noted, license server 401 further contains license administrator 423, which includes a license issue module 425 for issuing a license to a licensee, a license update module 427 for issuing license updates to a license, and a license notification module 429 for notifying a licensee of license maintenance issues (such as renewals and available upgrades, etc.).

License confirmation manager 403 includes: a confirmation database 405 for storing confirmations received from licensee installations and updates; a database manager 407 for managing confirmations in confirmation database 405; a network interface 409 for communicating over network 321; an administrator interface 411 for human interfacing with queries and directives concerning confirmation matters; and a confirmation policy executive 413 for coordinating confirmation activities in accordance with predefined policy guidelines, including but not limited to those involved in carrying out the method described below concerning the update confirmation with respect the licensee administrator and the license administrator.

In a non-limiting exemplary application of operation according to embodiments of the present invention, a customer (licensee or prospective licensee) places an order for a license or license update, which is handled by licensee administrator 415, which then directs the issue of license/license update 309 by license administrator 423. Referring to FIG. 3 and the previous discussion thereof, client installation/update manager 313 then performs the installation or update as required, after which client confirmation manager 317 issues confirmation 100 via network 321 (FIG. 3 and FIG. 4), which is received by server confirmation manager 403 via a reception 404 to network interface 409. Confirmation manager 403 then stores confirmation 100 in confirmation database 405, so that licensee administrator 415 can verify that the order has been fulfilled and installed/updated by the licensee.

License Update Confirmation Method

Figure 5:
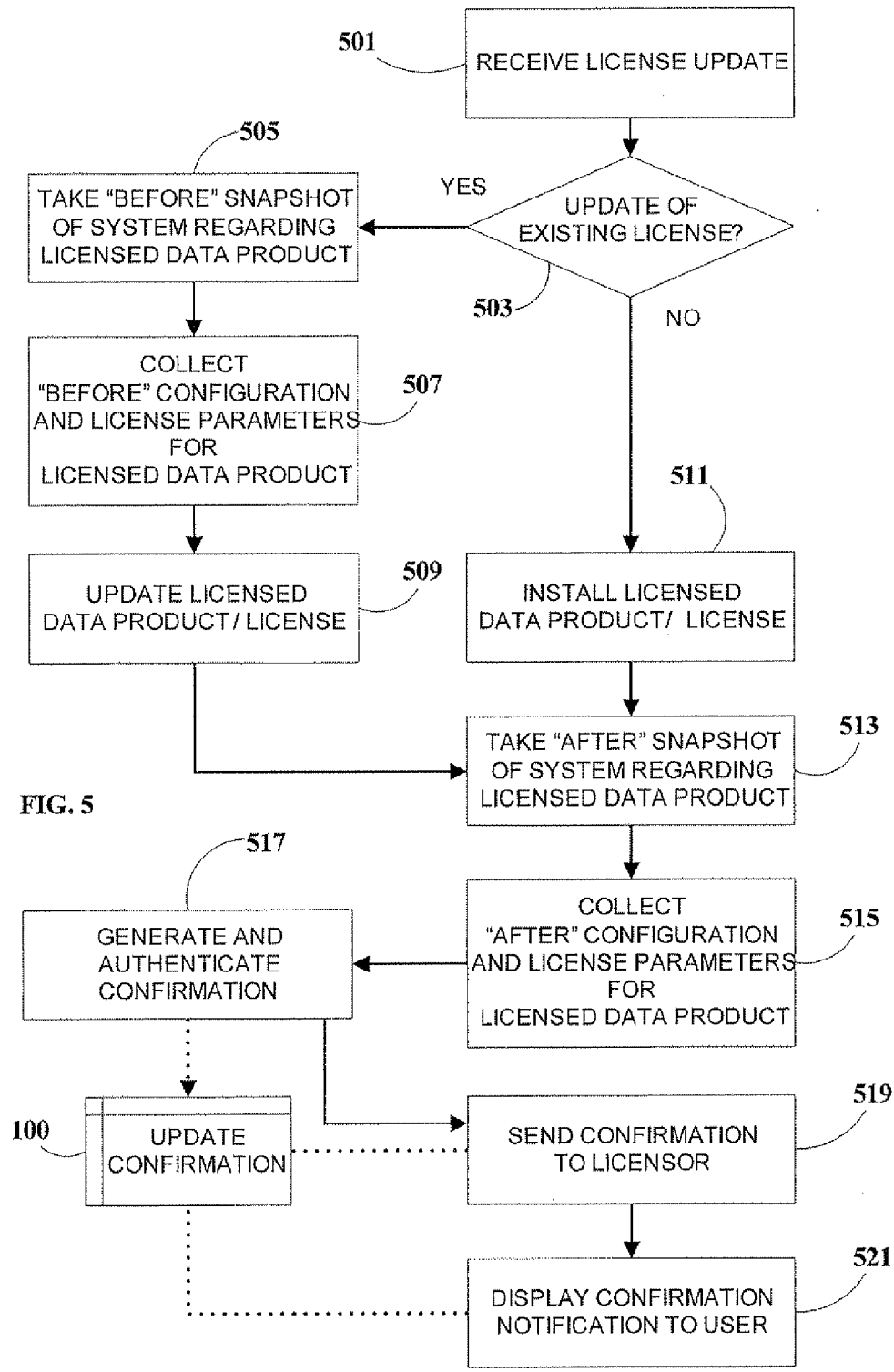
FIG. 5 is a flowchart of a method for generating and issuing a license update confirmation according to embodiments of the present invention.

FIG. 5 is a flowchart of a method for generating and issuing a license update confirmation according to embodiments of the present invention. Reference is also made to FIG. 3 and FIG. 4 and the previously presented corresponding descriptions thereof.

In a step 501 a client license update manager (such as license update manager 313 in FIG. 3) receives a license/license update (such as license/license update 309). At a decision point 503 it is determined whether this is an update of an existing license or an installation of a new license. If it is an update of an existing license, in a step 505 a "before" snapshot of the target computer system is taken, and in a step 507 a set of "before" configuration and license parameters for the existing licensed computer data product is collected. The "before" license parameters include the data contained in the fields related to the previous state (prior to update) of the digital confirmation as discussed above and illustrated in FIG. 1. Following this, the licensed computer data product is updated in a step 509. If, however, this is not an update of an existing license (i.e., it is an installation of a new license), then decision point 503 branches to a step 511, in which the licensed computer data product is installed along with the license thereto.

In either case, in a step 513 an "after" snapshot of the target computer system is taken, and in a step 515, a set of "after" configuration and license parameters for the existing licensed computer data product is collected. The "after" license parameters include the data contained in the fields related to the new state (after update or installation) of the digital confirmation as discussed above and illustrated in FIG. 1.

Following the collection of the new state parameters, confirmation 100 is generated and authenticated in a step 517. Next, confirmation 100 is sent to the licensor in a step 519. In an embodiment of the present invention, a confirmation notification is displayed to the user in a step 521.

Computer Program Product

A further embodiment of the present invention provides a computer program product for performing the above method disclosed in the present application or any variant derived therefrom. A computer program product according to this embodiment includes a set of executable commands for a computer, and is incorporated within machine-readable media including, but not limited to: magnetic media; optical media; computer memory; semiconductor memory storage; flash memory storage; and a computer network. The terms "perform", "performing", etc., and "run", "running", when used with reference to a computer program product herein denote the action of a computer when executing the computer program product, as if the computer program product were performing the actions. The term "computer" herein denotes any data processing apparatus capable of, or configured for, executing the set of executable commands to perform the foregoing method, including, but not limited to the devices as previously described as denoted by the term "computer".

While the invention has been described with respect to a limited number of embodiments, it will be appreciated that many variations, modifications and other applications of the invention may be made.

The invention claimed is:

1. A client computer having a processor and memory, configured to implement
    a) a client data product update manager, configured to install a specified update to an identified data product on the client computer; and
    b) a client update confirmation manager for use in a system for confirming that the specified update to the identified computer data product was performed on the client computer, the client update confirmation manager comprising:
    an update confirmation generator, configured to generate an update confirmation indicating a status of the specified update; and
    an authenticator, configured to generate and add to the update confirmation an authentication value for the update confirmation;
    wherein the update confirmation with authentication value is sent to a server license update confirmation manager remote from the client computer.

2. The client computer implementing a client update confirmation manager of claim 1, wherein the update confirmation comprises information indicative of at least one of:
    a data product update status;
    a post-update state of the client computer subsequent to the update;
    a confirmation identifier;
    a licensor identifier;
    a licensee identifier;
    a product identifier;
    a license update identifier;
    information of at least one of the product version, client configuration, and license, prior to the update;
    information of at least one of the product version, client configuration, and license, after the update;
    a client computer system identifier;
    a license update status;
    a license update log comprising information of at least one previous update event;
    a license update timestamp;
    information of the state of the client system prior to the update
    information of the state of the client system after the update;
    information for authenticating the confirmation; and
    a user confirmation code.

3. The client computer implementing a client update confirmation manager of claim 1, wherein the update confirmation includes information from a sequential update counter.

4. The client computer implementing a client update confirmation manager of claim 3, wherein the update confirmation consists of a number, whereby the installation of a plurality of updates performed in sequential order with no omissions can be confirmed.

5. The client computer implementing a client update confirmation manager of claim 1, wherein at least one of the client data product update manager and the client update confirmation manager is at least partially contained in the client computer.

6. The client computer implementing a client update confirmation manager of claim 1, wherein at least one of the client data product update manager and the client license update confirmation manager is at least partially contained in an external hardware device removably coupled to the client computer.

7. The client computer implementing a client update confirmation manager of claim 6, wherein the removable external hardware device includes a display configured to display a user confirmation code.

8. A system for confirming that a specified update to an identified computer data product was performed on a particular client computer, the system comprising:
   a) a client data product update manager, configured to be implemented on a particular client computer to install a specified update to an identified data product on the particular client computer;
   b) the client computer, having a processor and memory, configured to implement a client update confirmation manager comprising:
      an update confirmation generator, configured to generate an update confirmation indicating a status of the update; and
      an authenticator, configured to generate and add to the update confirmation an authentication value for the update confirmation; and
   c) a server computer having a processor and memory, configured to implement a server update confirmation manager configured to obtain the update confirmation with authentication value, comprising:
      a validator configured to validate the obtained update confirmation; and
      a confirmation database configured to store the validated update confirmation.

9. The system of claim 8, wherein at least one of the client data product update manager and the client update confirmation manager is at least partially contained in the client computer.

10. The system of claim 8, wherein at least one of the client data product update manager and the client update confirmation manager is at least partially contained in an external hardware device removably coupled to the client computer.

11. The system of claim 10, wherein the removable external hardware device includes a display configured to display a user confirmation code.

12. The system of claim 8, further comprising a sequential update counter configured to generate a sequence of numbers, wherein the update confirmation consists of a sequential number, and updates are performed in sequential order with no omissions.

13. A method for use in a system for confirming that a specified update to an identified computer data product was performed on a particular client computer, the method comprising:
   installing a data product update in a client computer having a processor and memory;
   generating an update confirmation indicating a status of the update;
   generating and adding to the update confirmation an authentication value for the update confirmation; and
   sending the update confirmation with authentication value to a server license update confirmation manager remote from the client computer.

14. The method of claim 13, further comprising:
   obtaining the update confirmation by an update confirmation manager in a server having a processor and memory remote from the client computer,
   whereby the installation of the data product update in the client computer is confirmed.

15. The method of claim 14, further comprising:
   adding an authentication value to the update confirmation before said obtaining; and
   validating the update confirmation after said obtaining.

16. The method of claim 14, wherein the update confirmation consists of a number obtained from a sequential update counter, whereby a plurality of updates performed in sequential order with no omissions may be confirmed.

17. The method of claim 13, further comprising collecting configuration and license parameters for the licensed computer data product in the client computer after said installing; wherein the update confirmation is generated using said configuration and license parameters.

18. The method of claim 17, wherein the configuration and license parameters are selected from information indicative of:
   a data product update status;
   a post-update state of the client computer subsequent to the update;
   a confirmation identifier;
   a licensor identifier;
   a licensee identifier;
   a product identifier;
   a license update identifier;
   information of at least one of the product version, client configuration, and license, prior to the update;
   information of at least one of the product version, client configuration, and license, after the update;
   a client computer system identifier;
   a license update status;
   a license update log comprising information of at least one previous update event;
   a license update timestamp;
   information of the state of the client system prior to the update
   information of the state of the client system after the update;
   information for authenticating the confirmation; and
   a user confirmation code.

19. The method of claim 18, further comprising collecting configuration and license parameters before said installing.

20. The method of claim 18, further comprising displaying a user confirmation code.

21. A computer readable storage device storing computer-readable instructions which, when read by cooperating elements of a system for confirming that a specified update to an identified computer data product was performed on a particular client computer, causes the system to perform a method comprising:
   installing the specified update to the identified data product on the particular client computer, the client computer having a processor for processing the update and a memory for storing the processed update;
   generating an update confirmation indicating the status of the data product update;
   adding to the update confirmation an authentication value for the update confirmation;
   obtaining the update confirmation by an update confirmation manager in a server remote from the client computer;
   validating the obtained update confirmation; and storing the validated update confirmation in a confirmation database,
   whereby the installation of the data product update in the client computer is confirmed.

* * * * *